US012658705B2

(12) United States Patent
Cudak et al.

(10) Patent No.: US 12,658,705 B2
(45) Date of Patent: *Jun. 16, 2026

(54) OVERCOOLING AN EDGE DEVICE THAT USES ELECTRICAL ENERGY FROM A LOCAL RENEWABLE ENERGY SYSTEM

(71) Applicant: Lenovo Global Technology (United States) Inc., Morrisville, NC (US)

(72) Inventors: Gary D Cudak, Raleigh, NC (US); Vinod Kamath, Raleigh, NC (US); Makoto Ono, Chapel Hill, NC (US); Gregory Pruett, Raleigh, NC (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/797,408

(22) Filed: Aug. 7, 2024

(65) Prior Publication Data

US 2024/0396338 A1     Nov. 28, 2024

Related U.S. Application Data

(63) Continuation of application No. 17/697,165, filed on Mar. 17, 2022, now Pat. No. 12,100,959.

(51) Int. Cl.
*H02J 3/28* (2026.01)
*G06F 1/20* (2006.01)
(Continued)

(52) U.S. Cl.
CPC .............. *H02J 3/28* (2013.01); *G06F 1/206* (2013.01); *H02J 3/003* (2020.01); *H02J 3/381* (2013.01);
(Continued)

(58) Field of Classification Search
CPC .... H02J 3/28; H02J 3/003; H02J 3/381; H02J 2300/28; H02J 2300/24; G06F 1/206
See application file for complete search history.

(56) References Cited

U.S. PATENT DOCUMENTS

| | | | |
|---|---|---|---|
| 6,658,874 B1 * | 12/2003 | Trent | F24F 3/153 62/90 |
| 8,131,401 B2 * | 3/2012 | Nasle | G05B 23/0235 700/286 |

(Continued)

FOREIGN PATENT DOCUMENTS

| | | | | |
|---|---|---|---|---|
| ES | 2635647 A1 * | 10/2017 | | H02S 10/10 |

*Primary Examiner* — Zahid Choudhury
(74) *Attorney, Agent, or Firm* — Jeffrey L. Streets

(57) ABSTRACT

An edge device, method and computer program product may perform, include or cause performance of various operations. The operations include determining an amount of electrical energy that an edge device is expected to have available from a local renewable energy system during each of a plurality of time periods and determining an amount of electrical energy that the edge device is expected to use for operations during each of the plurality of time periods. The operations further include identifying a first one of the time periods for which the determined amount of electrical energy that the edge device is expected to have available from the local renewable energy system is greater than the determined amount of electrical energy that the edge device is expected to use for operations and causing a cooling system that cools the edge device to perform an overcooling operation during the identified first time period.

20 Claims, 6 Drawing Sheets

(51) Int. Cl.
  *H02J 3/00* (2006.01)
  *H02J 3/38* (2006.01)
  *H02J 101/24* (2026.01)
  *H02J 101/28* (2026.01)

(52) U.S. Cl.
  CPC ....... *H02J 2101/24* (2026.01); *H02J 2101/28*
  (2026.01)

(56) References Cited

U.S. PATENT DOCUMENTS

| | | | | |
|---|---|---|---|---|
| 8,229,722 B2 * | 7/2012 | Nasle | .................... | G05B 17/02 |
| | | | | 703/13 |
| 8,655,496 B1 * | 2/2014 | Stewart | .................. | G06Q 50/06 |
| | | | | 700/286 |
| 11,811,258 B1 * | 11/2023 | Kanan | .................... | H02J 7/342 |
| 12,100,959 B2 * | 9/2024 | Cudak | .................... | H02J 3/003 |
| 2012/0179301 A1 * | 7/2012 | Aivaliotis | ................ | H02J 3/00 |
| | | | | 700/286 |
| 2014/0222228 A1 * | 8/2014 | Sawa | .................... | G06Q 50/06 |
| | | | | 700/291 |
| 2022/0109610 A1 * | 4/2022 | Guim Bernat | .......... | H04L 41/12 |
| 2022/0116535 A1 * | 4/2022 | Gaw | ........................ | G06T 5/50 |
| 2023/0182585 A1 * | 6/2023 | Koti | ........................ | B60L 58/32 |
| | | | | 307/10.1 |
| 2023/0208139 A1 * | 6/2023 | Holveck | .................. | H02J 3/17 |
| | | | | 700/295 |
| 2023/0299586 A1 * | 9/2023 | Cudak | .................... | H02J 3/003 |
| | | | | 700/295 |

* cited by examiner

50

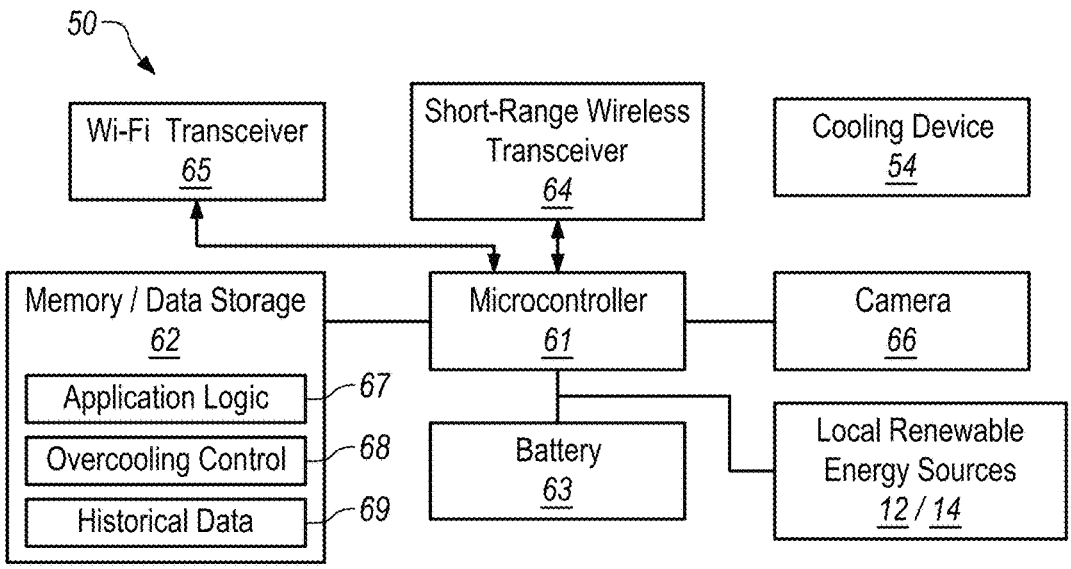

Wi-Fi Transceiver
65

Short-Range Wireless Transceiver
64

Cooling Device
54

Memory / Data Storage
62

Application Logic — 67

Overcooling Control — 68

Historical Data — 69

Microcontroller
61

Camera
66

Battery
63

Local Renewable Energy Sources
12 / 14

Short-Range Wireless Transceiver
84

Mobile Communications Transceiver
85

Wi-Fi Transceiver
83

GPS Transceiver
87

Battery
82

Processor
80

Camera
86

Memory / Data Storage
81

Image Analysis Application — 67

Trained AI Inference Engine — 71

Overcooling Control Logic — 68

Workload / Power Consumption History — 69

Touchscreen
88

Cooling Device
74

Local Renewable Energy Sources
12 / 14

*FIG. 4*

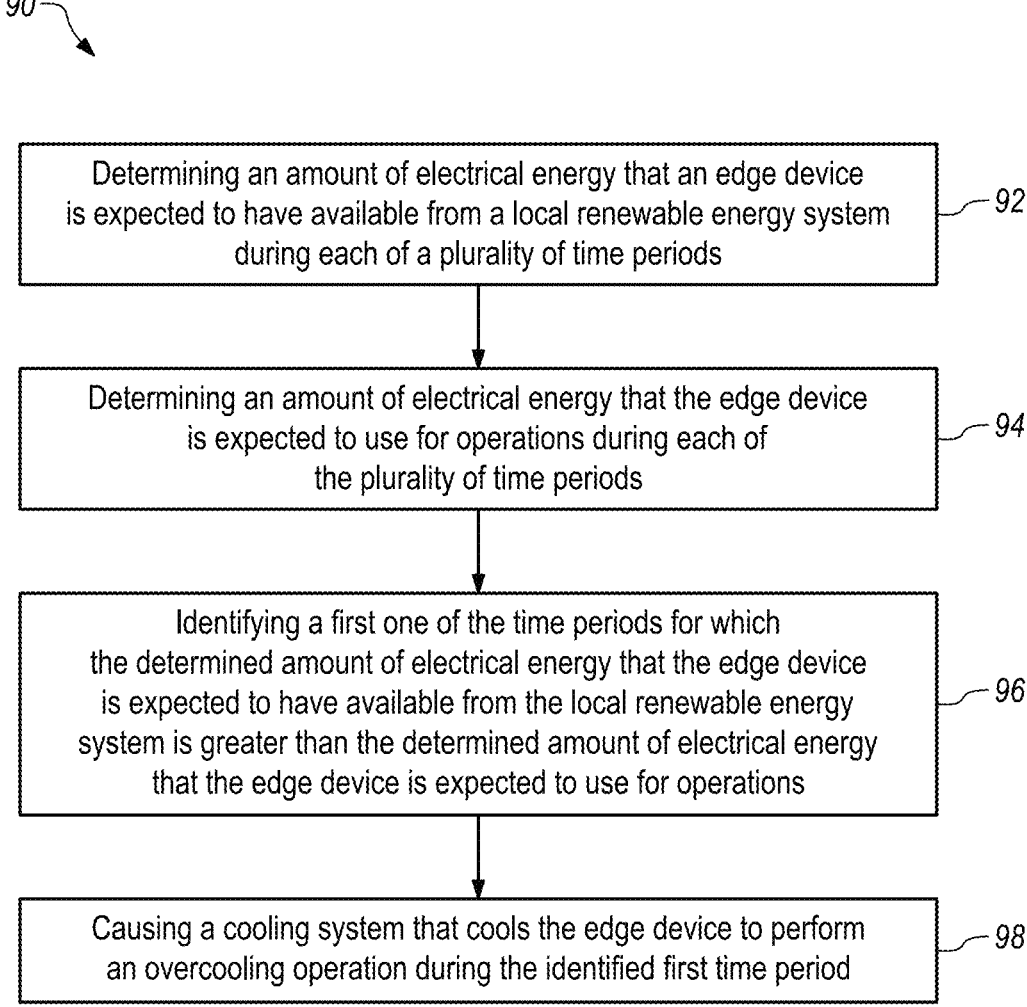

90

Determining an amount of electrical energy that an edge device
is expected to have available from a local renewable energy system
during each of a plurality of time periods — 92

Determining an amount of electrical energy that the edge device
is expected to use for operations during each of
the plurality of time periods — 94

Identifying a first one of the time periods for which
the determined amount of electrical energy that the edge device
is expected to have available from the local renewable energy
system is greater than the determined amount of electrical energy
that the edge device is expected to use for operations — 96

Causing a cooling system that cools the edge device to perform
an overcooling operation during the identified first time period — 98

*FIG. 6*

OVERCOOLING AN EDGE DEVICE THAT USES ELECTRICAL ENERGY FROM A LOCAL RENEWABLE ENERGY SYSTEM

BACKGROUND

The present disclosure relates to the operation of an edge device having a limited availability of electrical energy.

Background of the Related Art

Internet-of-Things (IoT) devices are physical objects or groups of objects that include sensors, processors, software and/or other technologies that are able to communicate over one or more communications networks, such as the Internet. Many IoT devices are now being deployed ever further to an outer edge of these networks. For example, a remote and/or standalone IoT device may operate in a location that does not have access to an electrical grid and is instead powered by limited and variable sources, such as a solar panel or wind generator. When processing and cooling requirements of the IoT device remain high over a period of decreased availability of power, the IoT device may be forced to throttle its processing operations at inopportune time periods.

An IoT device is just one example of a device that may operate at the outer edge of a network and may be referred to as an edge device. The operation of an edge device may experience challenges that are not experienced by computing systems in a datacenter where the infrastructure has been optimized to support the operation of the computing systems.

BRIEF SUMMARY

Some embodiments provide a computer program product comprising a non-volatile computer readable medium and non-transitory program instructions embodied therein, the program instructions being configured to be executable by a processor to cause the processor to perform certain operations. The operations comprise determining an amount of electrical energy that an edge device is expected to have available from a local renewable energy system during each of a plurality of time periods and determining an amount of electrical energy that the edge device is expected to use for operations during each of the plurality of time periods. The operations further comprise identifying a first one of the time periods for which the determined amount of electrical energy that the edge device is expected to have available from the local renewable energy system is greater than the determined amount of electrical energy that the edge device is expected to use for operations and causing a cooling system that cools the edge device to perform an overcooling operation during the identified first time period.

Some embodiments provide a method comprising determining an amount of electrical energy that an edge device is expected to have available from a local renewable energy system during each of a plurality of time periods and determining an amount of electrical energy that the edge device is expected to use for operations during each of the plurality of time periods. The method further comprises identifying a first one of the time periods for which the determined amount of electrical energy that the edge device is expected to have available from the local renewable energy system is greater than the determined amount of electrical energy that the edge device is expected to use for operations and causing a cooling system that cools the edge device to perform an overcooling operation during the identified first time period.

Some embodiments provide an edge device comprising at least one input device, a cooling system, a local rechargeable battery, at least one non-volatile storage device storing program instructions, and at least one processor configured to process the program instructions. The program instructions are configured to, when processed by the at least one processor, cause the edge device to perform certain operations. The operations comprise processing data received from the at least one input device, wherein electrical energy for processing the data is obtained solely from at least one local renewable energy source and a local rechargeable battery, and cooling the processor using the cooling system, wherein electrical energy for operating the cooling system is obtained solely from the at least one local renewable energy source and the local rechargeable battery. The operations further comprise causing the cooling system to perform an overcooling operation in response to the local rechargeable battery being charged to full capacity and determining that an amount of electrical energy that the edge device is expected to have available from the local renewable energy system during a current time period is greater than an amount of electrical energy that the edge device is expected to use for operations during the current time period.

BRIEF DESCRIPTION OF THE SEVERAL VIEWS OF THE DRAWINGS

FIG. 3 is a block diagram of an edge device having a first architecture.

FIG. 4 is a block diagram of an edge device having a second architecture.

FIG. 6 is a flowchart of operations in accordance with some embodiments.

DETAILED DESCRIPTION

Figure 1A:
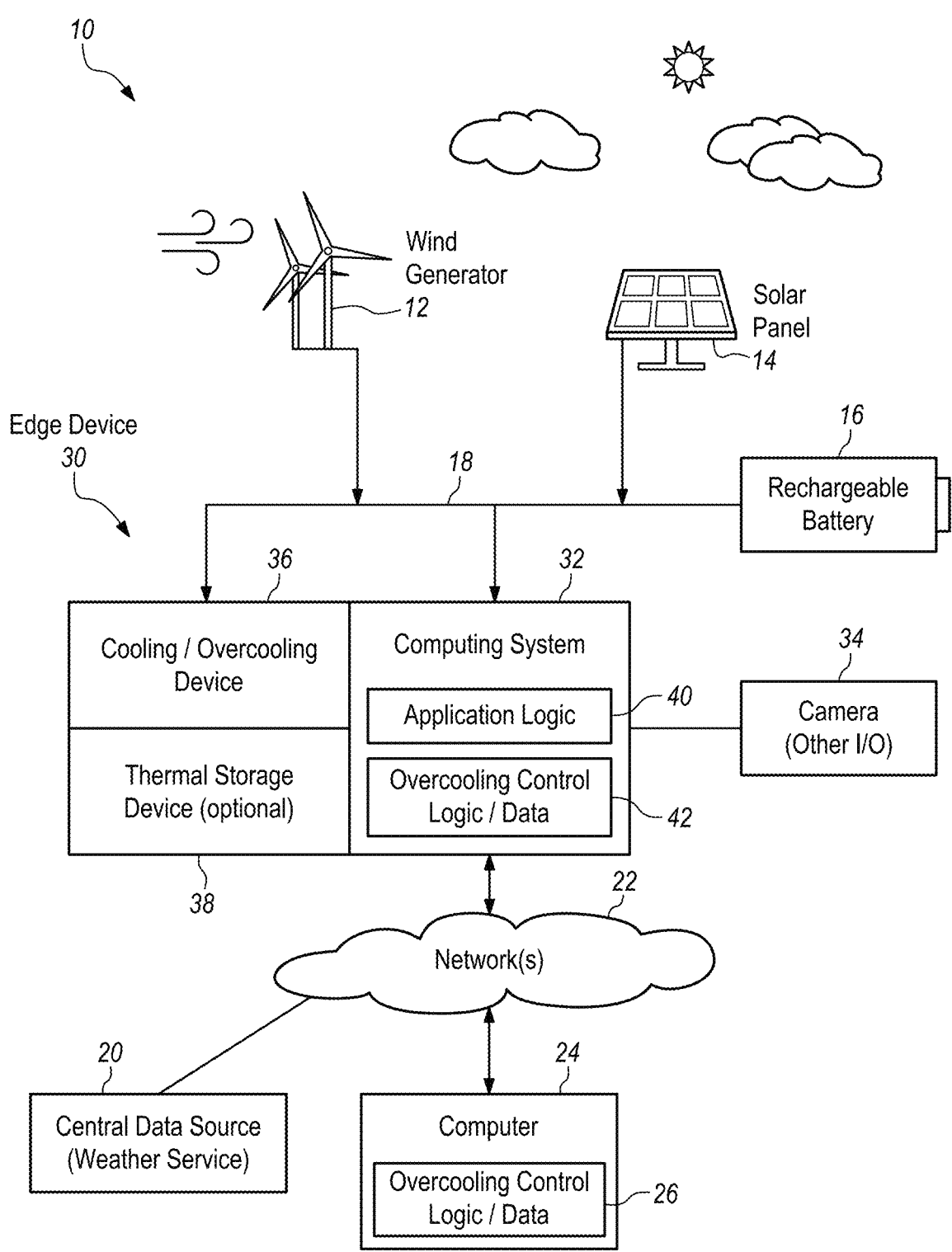
FIG. 1A is a diagram of a system including an edge device that is powered by energy produced solely by one or more renewable energy sources.

Some embodiments provide a computer program product comprising a non-volatile computer readable medium and non-transitory program instructions embodied therein, the program instructions being configured to be executable by a processor to cause the processor to perform certain operations. The operations comprise determining an amount of electrical energy that an edge device is expected to have available from a local renewable energy system during each of a plurality of time periods and determining an amount of electrical energy that the edge device is expected to use for operations during each of the plurality of time periods. The operations further comprise identifying a first one of the time periods for which the determined amount of electrical energy that the edge device is expected to have available from the local renewable energy system is greater than the determined amount of electrical energy that the edge device is expected to use for operations and causing a cooling system that cools the edge device to perform an overcooling operation during the identified first time period.

Embodiments of the edge device may vary widely, including edge devices that may take many forms and may perform many functions. An edge device is a unit of hardware that operates at the outer boundary or "edge" of a network. An edge device according to the present embodiments is located where access to an electrical grid is either not possible or not practical. Accordingly, the edge device may receive all of its electrical energy from a local renewable energy system that may be dedicated to the edge device and/or a plurality of edge devices. The edge device may perform any one or more of a wide variety of functions, including the operation and monitoring of a traffic camera, remote equipment monitoring and control, mobile or autonomous equipment operation, isolated telecommunications equipment operation, and the like. There is really no limit to the types of functions that the edge device may perform and/or the equipment in which the edge device may be employed.

In some embodiments, the local renewable energy system may include at least one solar panel and/or at least one wind generator. However, the local renewable energy system may include other types of energy generating systems that are currently known or developed in the future. It is expected that the local renewable energy system will have an electrical energy generating capacity selected to support the operation of the edge device. Still, the local renewable energy system adds to the total cost of ownership of the edge device, including an original capital investment and occasional maintenance. Therefore, the electrical energy generating capacity of the local renewable energy systems are typically no larger than necessary to support an average level of operations by the edge device. Without access to an electrical grid and relying solely on the local renewable energy systems for electrical energy, the edge device must make intelligent use of the electrical energy that is available at any point in time. In fact, the availability of electrical energy from the local renewable energy system is further complicated by the variability of electrical energy output from the system. For example, the electrical energy output from a solar panel is dependent upon the angle and intensity of sunlight directed onto the solar panel, which means that the time of day, season of the year and/or cloud coverage may have a direct effect on the amount of electrical energy output. In another example, the electrical energy output from a wind generator is dependent largely upon the wind speed at the location where the wind generator is operating. It may thus be appreciated that the output of the local renewable energy system is dynamic and varies as a function of certain weather conditions as described.

As used herein, the term "overcooling" means that a temperature is cooled to a lower temperature than is necessary to support a desired operation. For example, it may be desirable to maintain an edge device at a temperature of less than 175 degrees Fahrenheit (F.) when temporarily under a high processor workload and less than 140 F during an average or low processor workload over an extended period of time. Given this as background, it might be the case that a user would establish a cooling temperature setpoint of about 120 F, such that the cooling system would continue to operate until the temperature of the edge device had been reduced to the cooling temperature setpoint. However, embodiments may perform an overcooling operation to continue operating the cooling system so that the temperature of the edge device, anything within a common housing with the edge device, and/or a separate thermal storage device is dropped well below the cooling temperature setpoint. In fact, a processor can typically withstand temperatures as low as negative 40 F (i.e., −40 F), so there no harm in continuing to overcool the edge device well below the cooling temperature setpoint. Overcooling the device and/or something in thermal communication with the device during periods where the electrical energy would otherwise go unused, provides the benefit of reducing an amount of power consumption required to cool the device during subsequent time periods characterized by a low energy availability. Separately, it may be desirable to implement a threshold amount of excess energy that is necessary to initiate overcooling, thus reducing or eliminating any hysteresis (i.e., repeatedly switching back and forth between an overcooling storage operation and a battery storage operation).

In some embodiments, overcooling may be performed on the device or the environment immediately surrounding the device, such as within a housing. For example, the device may be directly overcooled by operating a thermoelectric cooling component with the cool side of the thermoelectric component in conductive thermal communication with the device and the warm side of the thermoelectric component in convective thermal communication with an external environment, such as an external environment outside a housing that contains the device. Alternatively, other cooling technologies and configurations may be employed. Furthermore, the air, other gas or other fluid surrounding the device may be overcooled, which will indirectly overcool the edge device.

In some embodiments, the operation of determining an amount of electrical energy that an edge device is expected to have available from a local renewable energy system during each of a plurality of time periods may include consideration of a weather forecast. For example, since the edge device receives electrical energy from the local renewable energy system, the average electrical energy output made available to the edge device from the local renewable energy system may be expected to vary as a function of a weather forecast and/or seasonal data. Specifically, the electrical energy output of a solar panel may be a function of total daylight hours and sunlight intensity which may both be affected by the season of the year and the geolocation of the device, and cloud coverage or other weather conditions affecting sunlight transmission through the atmosphere. The electrical energy output of a wind generator may be a function of average wind speed. The average electrical energy output available from each of the units in the local renewable energy system may also be affected by a known conversion efficiency or other design parameters of the specific local power sources.

In some embodiments, the operation of determining an amount of electrical energy that the edge device is expected to use for operations during each of the plurality of time periods may include consideration of a workload and/or power consumption history for the edge device. For example, the device may store historical data of previously measured workload and/or power consumption of the edge device and determine an expected device workload and/or an expected device power consumption based upon the historical workload data and/or historical power consumption data. Trend analysis may identify a pattern of workload and/or power consumption as a function of a time of day, a day of the week, or some other schedule, or perhaps responsive to one or more event or event type. In one specific example, an edge device may use artificial intelligence (AI) and/or machine learning (ML) to analyze data from a local camera for the purpose of identifying individuals with facial recognition. The number of people passing in the field of view of the camera may determine the workload and/or power consumption of the edge device and may vary as a function of time of day and/or day of the week (i.e., morning and evening commuting during a standard Monday to Friday workweek) and may also increase in response to some nearby event that draws a large crowd (i.e., a concert venue having an evening or weekend performance).

Embodiments include the operation of identifying a first one of the time periods for which the determined amount of electrical energy that the edge device is expected to have available from the local renewable energy system is greater than the determined amount of electrical energy that the edge device is expected to use for operations. Optionally, a predetermined amount of offset may be included, such that the operation may include identifying a first time period during which the determined amount of electrical energy that the edge device is expected to have available is greater than a sum of the determined amount of electrical energy that the edge device is expected to use for operations and the predetermined amount of offset.

In some embodiments, the operations may further include identifying a second time period during which the determined amount of electrical energy that the edge device is expected to use performing operations is greater than the determined amount of electrical energy that the edge device is expected to have available. Previously overcooled air, other gas or fluid, and/or solid thermal storage device or thermal storage mass may subsequently be caused to absorb heat from the warm/hot components of the edge device and/or the environment immediately surrounding the edge device. Using overcooling during a first time period to absorb heat during the second time period may reduce or eliminate the use of electrical energy for active cooling of the edge device and enable a greater proportion of the available electrical energy to be used for the operation of the edge device. Depending upon a sequence of events, it is possible that the use of overcooling to subsequently absorb heat during the second time period will reduce or eliminate the use of energy for active cooling of the device and enable a greater proportion of the available energy to be used for both the operation of the device and recharging of the battery.

For embodiments that include a thermal storage device that is in selective thermal communication with the device and/or the environment around the device, the method may include causing the thermal storage device to cool the device and/or the environment around the device during the identified second time period. For example, if the thermal storage device includes a container for storage of cold air, the thermal storage device may be caused to cool the device and/or the environment around the device by actuating a valve or other barrier to an open position between the container and the device or environment so that the cold air may circulate into thermal communication with the device.

In some embodiments, the operations may further include obtaining weather forecast data for each of the plurality of time periods. Then, for each of the plurality of time periods, the weather forecast data may be used in the operation of calculating the amount of electrical energy that the local renewable energy system is expected to provide to the edge device. For example, cloud coverage may be used to adjust the expected electrical energy output of a solar panel and windspeed may be used to adjust the expected electrical energy output of a wind generator. The weather forecast data is preferably obtained over a wide area network from a web-based weather service. Obtaining such data from one or more central sources may relieve the device of running prediction software and/or performing extensive calculations. The granularity of the data that the device receives from the central data source may also be set by or for the device, such that the device receives only the amount of data desired or useful for determining an amount of power output expected from any one or more of the local power sources during any time period. For example, a user interface to the device may allow a user to establish a value of a setting for a frequency, or duration of time periods, at which the device should calculate an expected total energy availability to the device. The weather forecast and/or seasonal data obtained from the central data source may have a granularity that is the same or similar to the frequency of the calculation of expected total energy availability to the device. For example, hourly forecast data of the average windspeed and/or cloud coverage during that hour may be desired if the device settings establish hourly calculations of expected total energy availability to the device.

In one option, the operations may further include receiving user input establishing a duration for each of the plurality of time periods and requesting that the web-based weather service provide the edge device with average weather forecast data for each of the plurality of time periods. In a further option, the operations may further include receiving user input establishing a set of weather parameters to be used in calculating the amount of electrical energy output that the local renewable energy system is expected to provide to the edge device and requesting that the web-based weather service provide only the set of weather parameters for each of the plurality of time periods. For example, the set of weather parameters may include cloud coverage if the local renewable energy system includes a solar panel and/or windspeed if the local renewable energy system includes a wind generator but may exclude other weather parameters such as humidity or air temperature if they are deemed irrelevant or at least are not to be used in determining the electrical energy output of the local renewable energy system.

In some embodiments, the operations may further include accessing historical power consumption data for the operation of the edge device. The edge device may, for example, store historical power consumption data in a memory component of the edge device. Optionally, the historical power consumption data may have a user-specified granularity, such as the average power consumption during a time period, so that only a limited amount of memory is used for this purpose. Accordingly, the amount of electrical energy that the edge device is expected to use for operations during each of the plurality of time periods may be determined based on an average of the historical power consumption for the same time period of the day, the same day of the week, and/or responsive to the occurrence of the same type of an event.

In some embodiments, the overcooling operation may reduce the temperature of the edge device and/or a thermal storage device. The thermal storage device may be a passive device, such as a thermal mass located within the same housing as the edge device. For example, if the cooling system is designed to cool air inside a housing that contains the computing components (i.e., processor, memory, etc.) of the edge device, then any overcooling of the air may also overcool the computing components of the edge device and/or any thermal storage device present inside the housing or in thermal communication with the air inside the housing. The thermal storage device may include any material or configuration that stores a potential for cooling the device. For example, a thermal storage device may include a material having a high heat capacity or high thermal mass and/or an insulated container that stores cold air or other fluid. Non-limiting examples of material with a high volumetric heat capacity (VHC) include fluids such as water, phase change materials (PCMs) such as a semiclathrate hydrate, or a solid such as concrete or metal. The use of a thermal storage device may increase the amount of overcooling that may be achieved during periods when excess energy is available and, therefore, may provide greater potential for reducing or eliminating an amount of energy that must be directed to cooling during periods that the device is experiencing high workload and/or power consumption. However, the thermal storage device may also be an active device, such as a thermal storage device that is in selective or periodic thermal communication with the device. Selective or periodic thermal communication may be provided, for example, by capturing cold air from the housing or an outside environment in a small insulated or underground tank or container at night and releasing the cold air into the housing containing the edge device during the day as needed based on the edge device power consumption or external environmental heat load. Capturing and subsequently releasing the air from the tank may be accomplished with one or more actuated valves or other moveable barriers.

In some embodiments, a thermal storage device is in selective thermal communication with the edge device. The operations may further include identifying a second one of the time periods for which the determined amount of electrical energy that the edge device is expected to have available from the local renewable energy system is less than the determined amount of electrical energy that the edge device is expected to use for operations and causing the thermal storage device to be placed in thermal communication with the edge device to cool the edge device during the identified second time period.

In some embodiments, the edge device further includes, or is otherwise electrically connected to, a local rechargeable battery. The operations may further include causing the local rechargeable battery that supplies electrical energy to the edge device to be fully recharged prior to causing the cooling system that cools the edge device to perform the overcooling operation during the identified first time period. Optionally, any electrical energy that is available to the edge device in excess to the amount of power necessary to support operation of the edge device (i.e., "excess energy") is preferably directed to recharging a battery to a fully charged condition before directing excess energy to performing overcooling. While overcooling may reduce the amount of available energy that must be dedicated to cooling of the device in the future, the battery is capable of storing and releasing electrical energy to directly support the operation of the edge device itself. Furthermore, energy stored by the local rechargeable battery may be used to support cooling of the edge device as well as operation of the edge device itself and is, therefore, the highest priority use for any excess energy. Once the local rechargeable battery is fully charged, then any further excess energy being generated by the local renewable energy sources may be directed to overcooling.

In some embodiments, the determinations and/or calculations that support a decision to overcool the edge device and/or one or more materials in thermal communication with the edge device may be performed by a computer other than the edge device that is the focus of the overcooling decision.

For example, the edge device may have the capacity to communicate over a network to a computer having greater computing capacity, greater access to electrical power and/or greater cooling capacity. Accordingly, it may be advantageous for the edge device to transmit updated operating parameters over the network to the computer and receive an instruction whether or not to direct local power to overcooling.

Some embodiments provide a method comprising determining an amount of electrical energy that an edge device is expected to have available from a local renewable energy system during each of a plurality of time periods and determining an amount of electrical energy that the edge device is expected to use for operations during each of the plurality of time periods. The method further comprises identifying a first one of the time periods for which the determined amount of electrical energy that the edge device is expected to have available from the local renewable energy system is greater than the determined amount of electrical energy that the edge device is expected to use for operations and causing a cooling system that cools the edge device to perform an overcooling operation during the identified first time period. Furthermore, the method embodiments may further include any one or more steps performing any one or more operations of the computer program products described herein.

Some embodiments provide an edge device comprising at least one input device, a cooling system, a local rechargeable battery, at least one non-volatile storage device storing program instructions, and at least one processor configured to process the program instructions. The program instructions are configured to, when processed by the at least one processor, cause the edge device to perform certain operations. The operations comprise processing data received from the at least one input device, wherein electrical energy for processing the data is obtained solely from at least one local renewable energy source and a local rechargeable battery, and cooling the processor using the cooling system, wherein electrical energy for operating the cooling system is obtained solely from the at least one local renewable energy source and the local rechargeable battery. The operations further comprise causing the cooling system to perform an overcooling operation in response to the local rechargeable battery being charged to full capacity and determining that an amount of electrical energy that the edge device is expected to have available from the local renewable energy system during a current time period is greater than an amount of electrical energy that the edge device is expected to use for operations during the current time period.

In some embodiments, the edge device may further include a thermal storage device. Furthermore, the operation of causing the cooling system to perform an overcooling operation may include causing the cooling system to perform an overcooling operation to overcool the thermal storage device. Still further, the operations may include identifying a second one of the time periods for which the determined amount of electrical energy that the edge device is expected to have available from the local renewable energy system is less than the determined amount of electrical energy that the edge device is expected to use for operations and causing the thermal storage device to cool the edge device during the identified second time period.

The foregoing edge computer (apparatus) embodiments may further include program instructions for implementing or initiating any one or more steps of the methods described herein and/or any one or more operations of the computer program products described herein.

FIG. 1A is a diagram of a system 10 including an edge device 30 that is powered by energy produced solely by one or more local renewable energy sources. In this example, the local renewable energy sources include a wind generator 12 and a solar panel 14. In order to smooth out some of the variability in the electrical energy output from the local renewable energy sources 12, 14, the system further includes a rechargeable battery 16. The wind generator 12, the solar panel 14, and the battery 16 are coupled to a power bus 18 that supplies electrical energy to the edge device 30. While the rechargeable battery 16 may be discharged to supply electrical energy onto the power bus 18, the rechargeable battery 16 may also be charged using electrical energy on the power bus 18 that was generated by one or both of the wind generator 12 and the solar panel 14.

The electrical energy on the power bus 18, which may be supplied by any one or more of the wind generator 12, the solar panel 14, and the battery 16 at any particular point in time, is used by the edge device 30. In the illustrated embodiment, the edge device 30 includes a computing system 32, a camera 34 providing input to the computing system 32, and a cooling device 36 that may also be used for overcooling. An optional thermal storage device 38 may also be included or utilized to increase an amount of overcooling that may be performed.

The computing system 32 (see FIG. 2 for more details) runs application logic 40 for analyzing input from the camera 34 and performing any other operations of the edge device 30. The computing system 32 may also run overcooling control logic 42 for controlling the cooling device 36 and the optional thermal storage device 38.

Although the computing system 32 and the cooling device 36 are illustrated having separate electrical connections to the power bus 18, the computing system 32 may distribute electrical energy to the cooling device 36 and/or the camera 34. Still further, the camera 34 or other input/output devices may also have a separate electrical connection to the power bus 18. However, the computing system 32 may control the supply of electrical energy to the camera 34, the cooling device 36, and the thermal storage device 38 if the thermal storage device is an active device that uses electrical energy.

The overcooling control logic 42 may cause the computing system to request and receive weather data from a central data source 20, such as a web-based weather service. Optionally, the overcooling control logic 42 may cause the computing system to communicate with a remote computer 24 that may perform any one or more functions of the overcooling control logic 26. In one example, the computing system 32 may offload some of the computational load of the computing system so that it is performed on the computer 24. Specifically, the computing system of the edge device 30 may provide operating data, weather data and any other information to the computer 24 for processing to determine whether or not to perform overcooling. The computer 24 may then return a control signal instructing the edge device 30 when to perform overcooling and when not to perform overcooling.

Figure 1B:
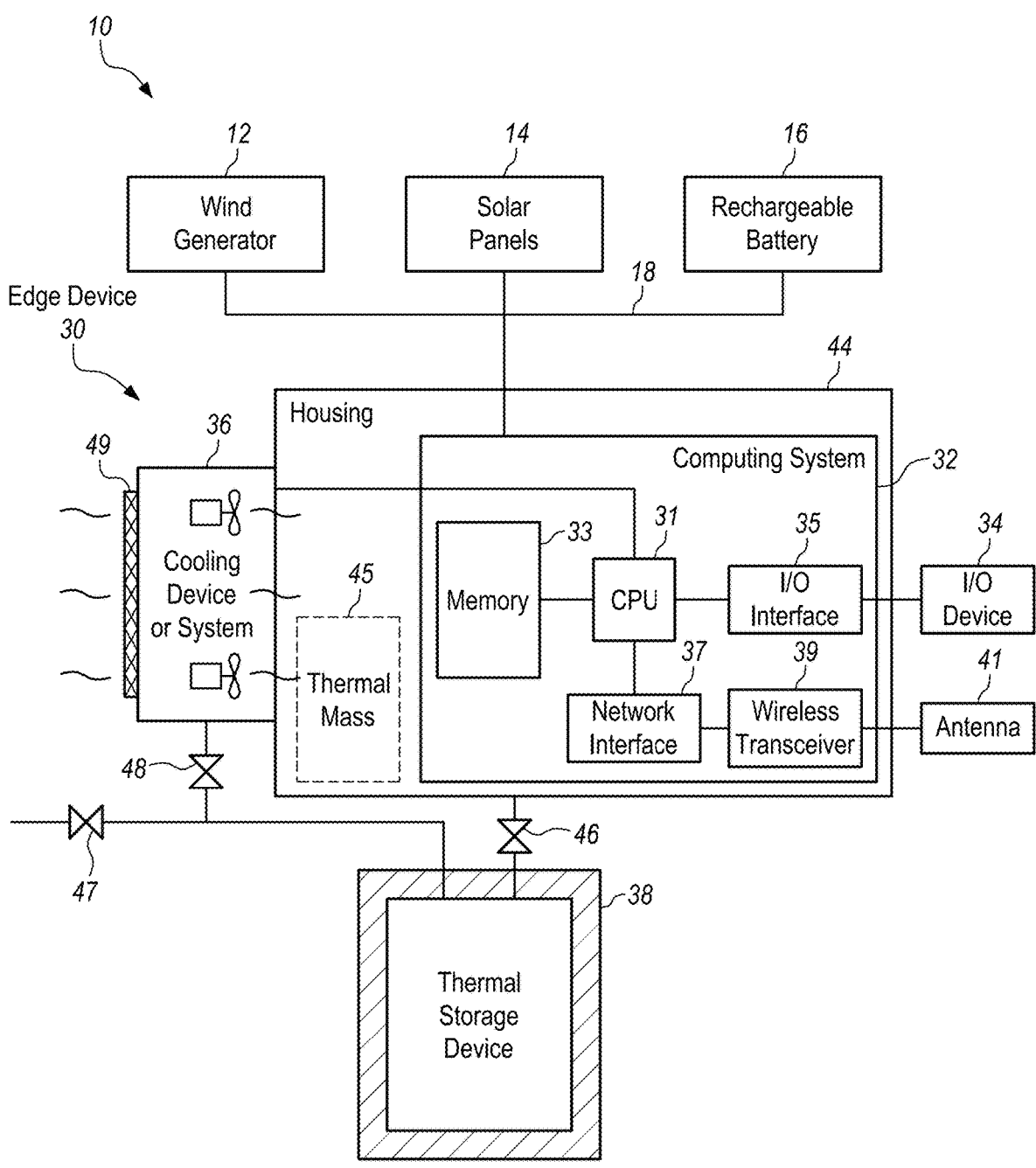
FIG. 1B is a diagram of the system of FIG. 1A including additional detail of some embodiments of the edge device.

FIG. 1B is a diagram of the system 10 including additional detail of one embodiment of the edge device 30. As in FIG. 1A, the edge device 30 is coupled to the power bus 18 that may receive electrical energy from the wind generator 12, the solar panel 14 and/or the rechargeable battery 16. The computing system 32 is contained inside a housing 44 and the cooling device or system 36 may cool the air inside the housing 44. The computing system 32 includes a computing system that includes a central processing unit (CPU) 31 and memory 33. The computing system may further include an input/output (I/O) interface 35 for connecting the I/O device 34, such as a camera, and a network interface 37 that supports communication with a network. As shown, the computing system includes a wireless transceiver 39 with an antenna 41, wherein the wireless transceiver 39 is coupled to the network interface 37. The wireless transceiver 39 may support a connection to a local area network (LAN) and/or the Internet using a WiFi standard or a mobile communications network standard. For example, the wireless transceiver 39 and the antenna 41 may enable the computing system 32 to receive weather data and transmit data resulting from the application logic.

As the computing system 32 runs a workload, such as the application logic 40 (see FIG. 1A), heat may be generated and the temperature of the computing system 32, air inside the housing 44 and other items that may be within the housing 44 may rise. The cooling device or system 36 is responsible for cooling the computing system 32 to an acceptable temperature, which may be prescribed by a temperature setpoint. However, embodiments may further utilize the cooling device or system 36 to perform overcooling. For example, the cooling device or system 36 may overcool the air (or other gas or liquid inside the housing), overcool some or all of the computing system 32, and/or overcool a thermal storage device 38 or the contents of the thermal storage device 38. In a further option, the cooling device or system 36 may overcool a thermal mass 45 disposed inside the housing 44.

The illustrated thermal storage device 38 takes the form of a hollow container with insulated walls. The device 38 is an active device that requires actuation of valves, such as flapper valves, in coordination with the cooling device 36 to direct air into and out of the container. In one example, after overcooling the air inside the housing 44, a first valve 46 and a second valve 47 may both be opened while fans of the cooling device 36 force some of the overcooled air into the thermal storage device 38. Then, the first and second valves 46, 47 may both be closed to trap and store overcooled air until needed at a later time period. For example, a third valve 48 and the first valve 46 may both be opened while the cooling device fans are operated to push or draw the overcooled air from the thermal storage device 38 into the housing 44. In a separate example, cold air from an external environment may be drawn in through the second valve 47 and into the thermal storage device 38 by opening the first and second valves 46, 47 while running the fans of the cooling device 36 in a reverse direction and expelling air through a filter port 49. Other configurations for storing overcooled air or other materials can be envisioned in light of the foregoing examples.

Figure 2A:
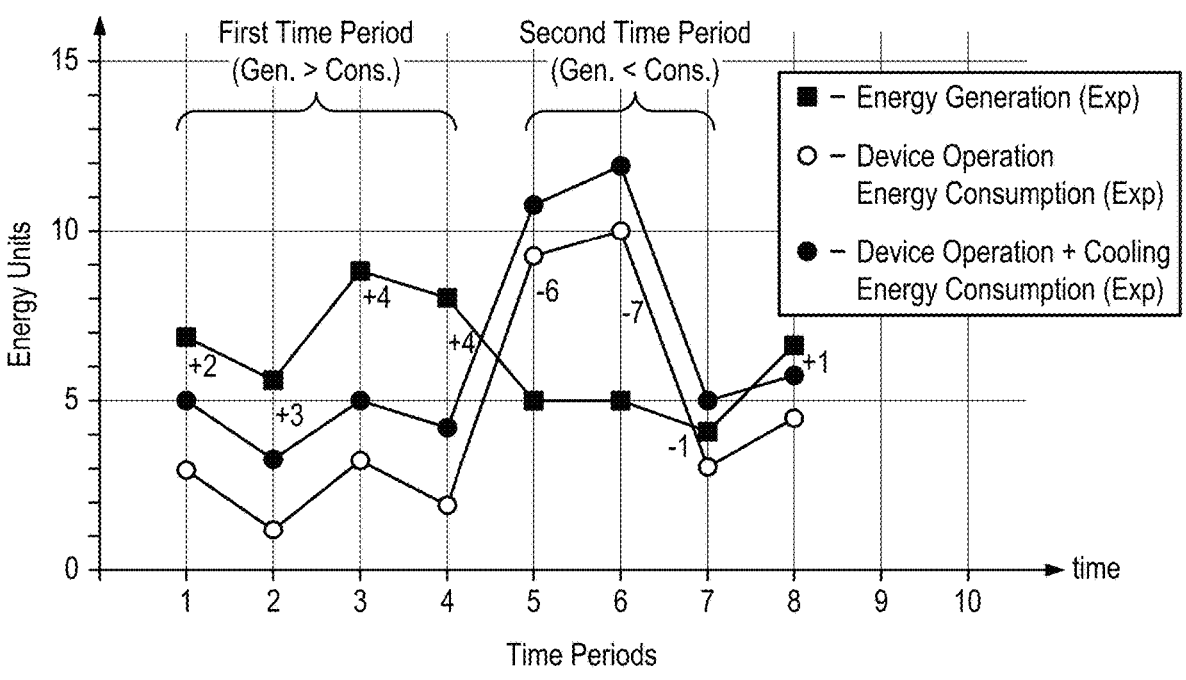
FIG. 2A is a graph illustrating an amount of local energy generation by the renewable energy sources and an amount of energy consumed by the edge device for operations and cooling for each of a plurality of time periods.

FIG. 2A is a graph illustrating an amount of local energy generation by the renewable energy sources (datapoints illustrated as filled squares), an amount of energy consumed by the edge device for operations (datapoints illustrated as open circles), and an amount of total energy consumed for both operations and cooling (datapoints illustrated as filled circles) for each of a plurality of time periods. As shown, the amount of energy consumed for cooling is assumed to be a constant two (2) energy units during each time period and is illustrated by the vertical distance of 2 energy units between the energy consumed by operations (open circles) and the energy consumed by both operations and cooling (filled circles). The energy consumed by the edge device for both operations and cooling (filled circles) represents the amount of electrical energy needed to maintain the ongoing operation and health of the edge device.

The determined amount of local energy generation by the renewable energy sources (datapoints illustrated as filled squares) may be compared with the determined amount of energy consumed by the edge device for operations and cooling (datapoints illustrated as filled circles) to identify a first time period (time periods 1-4) in which the electrical energy generation is greater than the electrical energy consumption. Optionally, this same comparison may identify a second time period (time periods 5-7) in which the electrical energy generation is less than the electrical energy consumption. Embodiments may perform overcooling of the air within the edge device housing during the identified first time period using some of the excess energy available during the identified first time period. In the subsequent second time period, embodiments may use the overcooled air to cool the edge device so that an amount of electrical energy consumed for cooling is reduced or eliminated during the second time period.

Figure 2B:
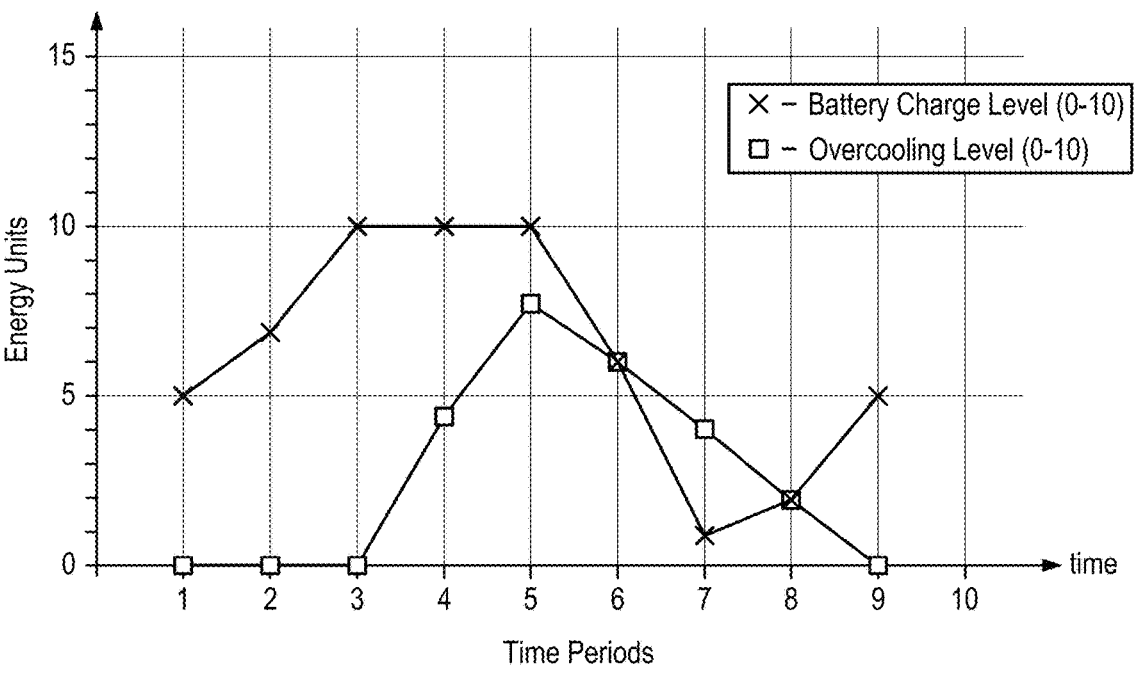
FIG. 2B is a graph illustrating a battery charge level and an overcooling level for each of the plurality of time periods in FIG. 2A.

FIG. 2B is a graph illustrating a battery charge level (datapoints represented by Xs) and an overcooling level (datapoints represented by opens squares) for each of the plurality of time periods in FIG. 2A. At the beginning of time period (TP) 1, the battery has a charge level of 5 in a range of 0 to 10 and the overcooling level is 0 in a range of 0 to 10. Since FIG. 2A shows excess energy of +2 energy units during TP 1 and the battery is not fully charged, the +2 units of excess energy are directed to recharging the battery from a charge level of 5 to a charge level of 7. So, FIG. 2A shows that, at the beginning of TP 2, the battery charge level is then 7 and the overcooling level remains at 0.

During TP 2, FIG. 2A shows excess energy of +3 energy units and the battery is still not fully charged per FIG. 2B, so the +3 units of excess energy are directed to recharging the battery from a charge level of 7 to a charge level of 10 (fully charged). So, as shown for the beginning of TP 3 in FIG. 2B, the battery charge level is then 10 and the overcooling level still remains at 0.

During TP 3, FIG. 2A shows excess energy of +4 energy units, so the +4 units of excess energy are directed to overcooling since the battery is already fully charged. So, as shown for the beginning of TP 4 in FIG. 2B, the battery charge level is still 10 (fully charged) and the overcooling level has increased to 4.

During TP 4, FIG. 2A shows excess energy of +4 energy units, so the +4 units of excess energy are again directed to overcooling since the battery is still fully charged. So, as shown for the beginning of TP 5 in FIG. 2B, the battery charge level is still 10 (fully charged) and the overcooling level has increased to 8.

TP5 is much different than the previous TP1-TP4 because it is part of the second time period in which the electrical energy generation is less than the electrical energy consumption. Specifically, during TP 5, FIG. 2A shows an energy deficit of −6 energy units. A first step may be to shut down the cooling device and rely upon the overcooling. However, as stated earlier, it was assumed that the electrical energy consumption for cooling was +2 energy units during each time period. So, the use of overcooling serves to reduce power consumption to a deficit of −4 energy units, which is drawn from the rechargeable battery. So, as shown for the beginning of TP 6 in FIG. 2B, the battery charge level has dropped to 6 and the overcooling level has been reduced from 8 to 6.

TP6 is similar to TP5, such that the initial energy deficit of −6 energy units may be offset to −4 energy units by reliance on the overcooled air instead of running the cooling device (a savings of 2 energy units). So, as shown for the beginning of TP 7 in FIG. 2B, the battery charge level has dropped from 6 to 1 and the overcooling level has been reduced from 6 to 4.

During TP7, the initial energy deficit of −1 energy units may be offset by reliance on overcooling such that there is +1 energy unit that may be used to recharge the battery. So, as shown for the beginning of TP 8 in FIG. 2B, the battery charge level has increased from 1 to 2 and the overcooling level has again been reduced from 4 to 2.

During TP8, initial excess energy of +1 energy units is increased by continuing to rely upon overcooling to avoid using the cooling device. Accordingly, there is +3 energy unit that may be used to recharge the battery. So, as shown for the beginning of TP 9 in FIG. 2B, the battery charge level has increased from 2 to 5 and the overcooling level has reduced to 0.

In reference to FIG. 2A, it should be appreciated that without the rechargeable battery, the edge device must be shut down any time that the local renewable energy sources are not producing electrical energy and would need to be throttled during any time period that the local renewable energy sources are not meeting the edge device's demand for electrical energy. In reference to FIG. 2B, it should be further appreciated that without the performance of overcooling during the sixth time period, the rechargeable battery would have run out of charge during TP7 and TP8 causing the shutdown of the edge device.

FIG. 3 is a diagram of an edge device 50 according to one embodiment. The edge device 50 may include a microcontroller/processor 61, memory 62, a battery 63, a short-range wireless transceiver 64 (perhaps Bluetooth), a Wi-Fi transceiver 65, a camera 66, a cooling device 74, and a local renewable energy source 12, 14. The battery 63 and the local renewable energy source 12, 14 provide power to each of the other components and may allow the edge device 50 to be mobile or easily relocatable. The microcontroller/processor 61 may access the memory 62 to read and/or write data and/or read program instructions and may control use of the short-range wireless transceiver 64, the Wi-Fi transceiver 65, the camera 66 and the cooling device 74. Optionally, the memory 62 may include an image analysis program 67 and a trained artificial intelligence (AI) inference engine 71 both including program instructions that may be executed by the microcontroller 61 to cause the performance of various operations. The memory 62 may also store overcooling control logic 68 and workload/power consumption history data 69.

FIG. 4 is a diagram of another edge device 70. The edge device 58 may include a processor 80, memory or data storage device 81, a battery or other energy storage device 82, a camera or other input and/or output device 86, a cooling device 74, and a local renewable energy source(s) 12, 14. The edge device 70 may further include a touchscreen 88, short-range wireless transceiver 84, a wireless local area network transceiver ("Wi-Fi transceiver") 83, a mobile communication transceiver 85 for communication with a cellular communication network, and a global positioning system (GPS) transceiver 87.

The memory 81 may store one or more applications including program instructions that are executable by the processor 80. Such applications may include an operating system and applications that may perform various operations of the edge device embodiments described herein. For example, the memory 81 may include an image analysis application or program 67, a trained AI inference engine 71, overcooling control logic 68, and workload or power consumption history data 69.

Figure 5:
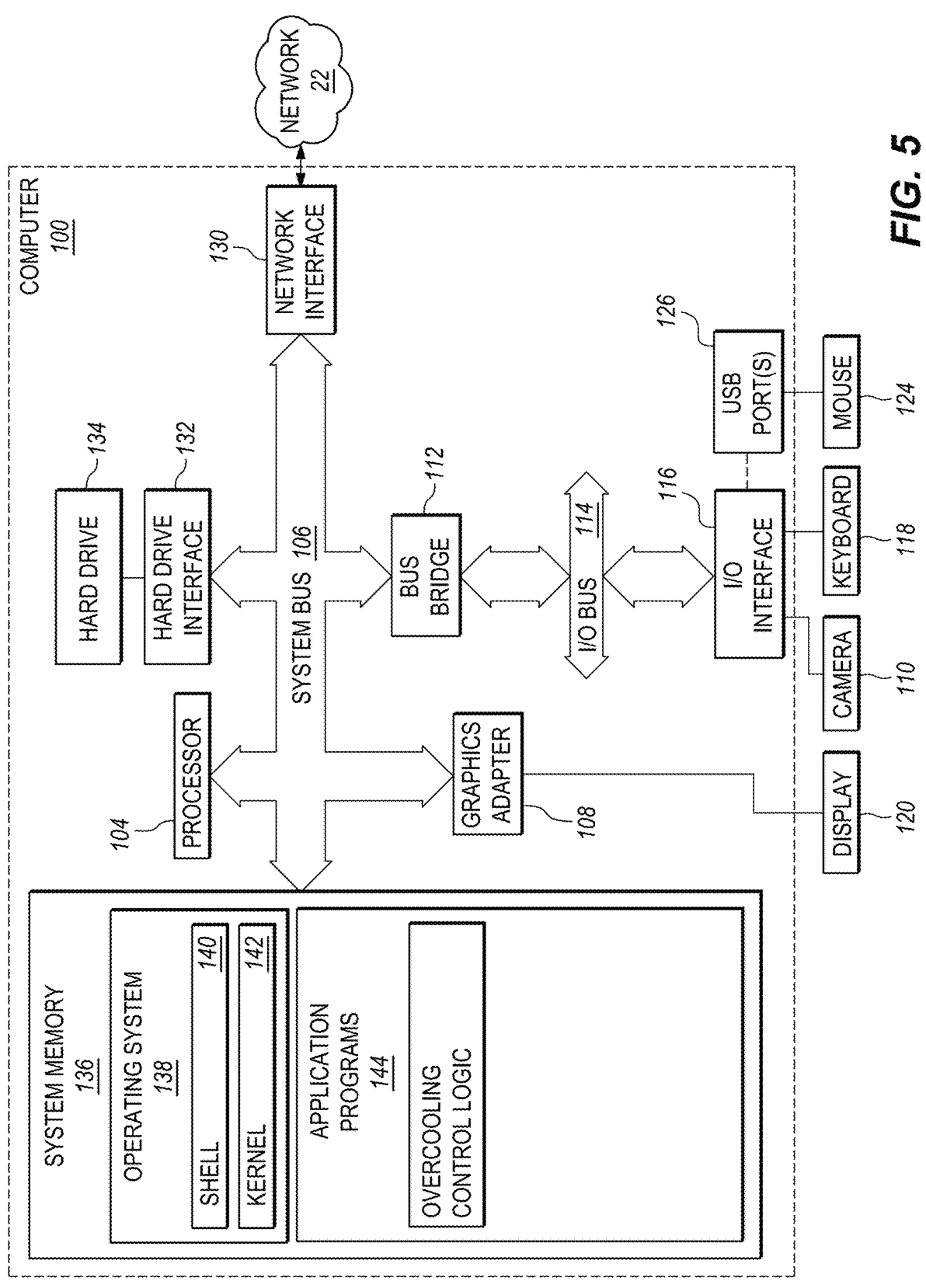
FIG. 5 is a block diagram of a computer that may perform various operations in accordance with some embodiments of an edge device or in support of an edge device.

FIG. 5 is a block diagram of a computer 100 that may be representative of an edge device and/or the computer 24 or central data source 20 of FIG. 1A. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 22 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions for the overcooling control logic 26, 43 that causes the processor 104 to perform the operations according to one or more embodiments. Depending upon whether the computer 100 is edge device, a central data source for a weather service, or a computer for offloading processing from the edge device, the application programs 144 may further include logic or applications to implement any of the embodiments disclosed herein.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

FIG. 6 is flowchart of operations 90 in accordance with some embodiments. Operation 92 includes determining an amount of electrical energy that an edge device is expected to have available from a local renewable energy system during each of a plurality of time periods. Operation 94 includes determining an amount of electrical energy that the edge device is expected to use for operations during each of the plurality of time periods. Operation 96 includes identifying a first one of the time periods for which the determined amount of electrical energy that the edge device is expected to have available from the local renewable energy system is greater than the determined amount of electrical energy that the edge device is expected to use for operations. Operation 98 includes causing a cooling system that cools the edge device to perform an overcooling operation during the identified first time period.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flow-chart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

determining an amount of electrical energy that an edge device is expected to have available from a local renewable energy system during each of a plurality of time periods;

determining an amount of electrical energy that the edge device is expected to use for operations performed by the edge device during each of the plurality of time periods;

identifying from the plurality of time periods a first time period for which the determined amount of electrical energy that the edge device is expected to have available from the local renewable energy system is greater than the determined amount of electrical energy that the edge device is expected to use for operations during the first time period;

identifying from the plurality of time periods a second time period that is after the first time period and during which the determined amount of electrical energy that the edge device is expected to use for operations performed by the edge device is greater than the determined amount of electrical energy that the edge device is expected to have available during the second time period; and causing a cooling system that cools the edge device to perform an overcooling operation during the identified first time period to lower an amount of electrical energy used by the cooling system for active cooling of the edge device during the second time period.

2. The computer program product of claim 1, wherein the operations performed by the edge device during the second time period comprise a recharging of a battery electrically connected to the edge device.

3. The computer program product of claim 1, wherein causing the cooling system that cools the edge device to perform the overcooling operation during the identified first time period lowers the amount of electrical energy used by the cooling system for active cooling of the edge device during a plurality of subsequent time periods that includes the second time period and a third time period subsequent to the second time period.

4. The computer program product of claim 1, wherein performing the overcooling operation lowers a temperature of the edge device, a component contained within a common housing with the edge device, and/or a thermal storage device.

5. The computer program product of claim 4, wherein the overcooling operation decreases the temperature of the edge device, the component, and/or the thermal storage device below a cooling temperature setpoint.

6. The computer program product of claim 4, wherein the cooling system includes a thermoelectric cooling component.

7. The computer program product of claim 1, wherein the edge device is contained in a housing, the overcooling operation reduces the temperature of air contained in the housing, and the overcooled air absorbs heat from the edge device during the second time period.

8. The computer program product of claim 1, wherein the overcooling operation reduces the temperature of a thermal storage device that is in selective thermal communication with the edge device, the operations further comprising:

causing the thermal storage device to be placed in thermal communication with the edge device to cool the edge device during the identified second time period.

9. The computer program product of claim 8, wherein the thermal storage device includes a container for storage of cooled air, and wherein causing the thermal storage device to be placed in thermal communication with the edge device includes actuating a valve into an open position between the container and the edge device.

10. The computer program product of claim 1, the operations further comprising:

causing a local rechargeable battery that supplies electrical energy to the edge device to be fully recharged prior to the causing of the cooling system that cools the edge device to perform the overcooling operation during the identified first time period.

11. The computer program product of claim 1, wherein the edge device is isolated from an electrical grid.

12. The computer program product of claim 1, wherein the local renewable energy system is a solar panel or a wind generator.

13. The computer program product of claim 1, wherein the edge device is connected to a local rechargeable battery.

14. The computer program product of claim 1, wherein the operation of identifying the first time period for which the determined amount of electrical energy that the edge device is expected to have available from the local renewable energy system is greater than the determined amount of electrical energy that the edge device is expected to use for operations during the first time period includes:

identifying a time period from the plurality of time periods for which the determined amount of electrical energy that the edge device is expected to have available from the local renewable energy system is greater than a sum of the determined amount of electrical energy that the edge device is expected to use for operations during the time period and a predetermined threshold amount of excess energy.

15. The computer program product of claim 1, further comprising:

transmitting operating parameters over a network to a computing device having greater computing capacity than the edge device, greater access to electrical power than the edge device and/or greater cooling capacity than the edge device; and receiving an instruction from the computing device indicating whether or not to perform the overcooling operation.

16. The computer program product of claim 1, the operations further comprising:

obtaining weather forecast data for each of the plurality of time periods, wherein, for each of the plurality of time periods, the weather forecast data is used in the operation of calculating the amount of electrical energy that the local renewable energy system is expected to provide to the edge device.

17. The computer program product of claim 16, wherein the weather forecast data is obtained over a wide area network from a web-based weather service.

18. The computer program product of claim 17, the operations further comprising:

receiving user input establishing a duration for each of the plurality of time periods; and requesting that the web-based weather service provide the edge device with average weather forecast data for each of the plurality of time periods.

19. The computer program product of claim 18, the operations further comprising:

receiving user input establishing a set of weather parameters to be used in calculating the amount of electrical energy that the local renewable energy system is expected to provide to the edge device; and requesting that the web-based weather service provide only the set of weather parameters for each of the plurality of time periods.

20. The computer program product of claim 1, the operations further comprising:

accessing historical power consumption data for the operation of the edge device, wherein the amount of electrical energy that the edge device is expected to use for operations during each of the plurality of time periods is determined based on an average of the historical power consumption for the same time period of the day, the same day of the week, and/or responsive to the occurrence of the same type of an event.

* * * * *